(12) United States Patent
Das et al.

(10) Patent No.: US 8,718,386 B2
(45) Date of Patent: May 6, 2014

(54) ADAPTIVE EVENT TIMELINE IN CONSUMER IMAGE COLLECTIONS

(75) Inventors: Madirakshi Das, Penfield, NY (US); Alexander C. Loui, Penfield, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 567 days.

(21) Appl. No.: 12/710,666

(22) Filed: Feb. 23, 2010

(65) Prior Publication Data

US 2011/0206284 A1 Aug. 25, 2011

(51) Int. Cl.
*G06K 9/62* (2006.01)

(52) U.S. Cl.
USPC ............ 382/225; 382/224; 382/172; 382/305

(58) Field of Classification Search
USPC .................................. 382/305, 172, 224–225
See application file for complete search history.

(56) References Cited

U.S. PATENT DOCUMENTS

| | | | |
|---|---|---|---|
| 6,351,556 B1 | 2/2002 | Loui et al. | |
| 6,606,411 B1 | 8/2003 | Loui | |
| 6,847,733 B2 * | 1/2005 | Savakis et al. | 382/225 |
| 6,915,011 B2 | 7/2005 | Loui et al. | |
| 6,950,989 B2 * | 9/2005 | Rosenzweig et al. | 715/721 |
| 8,117,210 B2 * | 2/2012 | Cerosaletti et al. | 707/749 |
| 2004/0263636 A1 * | 12/2004 | Cutler et al. | 348/211.12 |
| 2005/0116954 A1 * | 6/2005 | Ripps et al. | 345/440 |
| 2007/0008321 A1 * | 1/2007 | Gallagher et al. | 345/473 |

OTHER PUBLICATIONS

Annotating collections—models, Liangliang Cao et al., IEEE, 978-1-4244-2243-2, 2008, pp. 1-8.*
Time as Essence—digital libraries, Graham et al., ACM 1-58113-513, 2002 pp. 1-10.*
Automatic person annotation of family photo album, Zhao et al., Springer, CIVR 2006, LNCS 4071, pp. 163-172.*
Annotating collections—models, Liangliang Cao et al., IEEE, 1-4244-2243-2, 2008, pp. 1-8.*
Brockwell and David, supra pp. 179-187, Chapter 6 Nonstationary and Season Time Series Models, 2002.
Loui et al, Multidimensional image value assessment and ratiang for automated albuming and retrieval, Proc. IEEE Intern. Conf. on Image Processing (ICIP) 2008.
Cerosaletti et al, Measuring the perceived asthetic quality of photographic images, Proc. $1^{st}$ International Workshop on Quality of Multidmedia Experience (QoMEX), 2009.
Adrian Graham et al., "Time as Essence for Photo Browsing Through Personal Digital Libraries", In Proceedings of the $2_{nd}$ ACM/IEEE-CS joint conference on Digital libraries—JCDL '02, Published Jul. 13, 2002, [retrieved Mar. 14, 2011]. Retrieved from the internet <URL:http://citeseerx.ist.psu.edu/viewdoc/summary?doi=10.1.1.94.6397> entire document, especially Abstrac; Figs. 1-5; p. 1, col. 2; p. 2, col. 2; p. 3, col. 1 to col. 2; p. 4, col. 2; p. 5, col. 1; p. 6, col. 1.

(Continued)

*Primary Examiner* — Jayesh A Patel

(57) ABSTRACT

A method for organizing an event timeline for a digital image collection, includes using a processor for detecting events in the digital image collection and each event's associated timespan; determining the detected events that are significant in the digital image collection; and organizing the event timeline so that the event timeline shows the significant events and a clustered representation of the other events, made available to the user at different time granularities. The organized event timeline is also used for selecting images for generating output.

20 Claims, 8 Drawing Sheets

(56) References Cited

OTHER PUBLICATIONS

Mor Naaman et al., "Automatic Organization for Digital Photographs With Geographic Coordinates", In Proceedings of the $4^{th}$ ACM/IEEE-CS joint conference on Digital libraries—JCDL 2004, Published Jun. 7, 2004 [retrieved Mar. 14, 2011]. Retrieved from the Internet <URL: http://ilpubs.stanford.edu:8090/766/1/2004-27.pdf> entire document ; Fig. 4.

Das, Madirakshi et al., Detecting Significant Events in Personal Image Collections, 2009 IEEE International Conference on Semantic Computing, Sep. 14, 2009, pp. 116-123.

Loui, Alexander et al., "Automated Event Clustering and Quality Screening of Consumer Pictures for Digital Albumin", IEEE Transactions on Multimedia, vol. 5, No. 3, Sep. 1, 2003, pp. 390-402.

Search Report on European Application 11747851.1, dated Aug. 21, 2013.

* cited by examiner

ADAPTIVE EVENT TIMELINE IN
CONSUMER IMAGE COLLECTIONS

CROSS REFERENCE TO RELATED APPLICATION

Reference is made to commonly assigned U.S. patent application Ser. No. 12/487,686 filed Jun. 19, 2009, entitled "Detecting Significant Events in Consumer Image Collections" by Madirakshi Das et al, the disclosure of which is incorporated herein.

FIELD OF THE INVENTION

The invention relates generally to the field of digital image processing, and in particular to a method for organizing groups of digital images for efficient management and retrieval of events in consumer image collections.

BACKGROUND OF THE INVENTION

The proliferation of digital cameras, camera phones, and scanners has lead to an explosion of digital images and videos, creating large personal multimedia databases. Since taking digital pictures is easy and practically free, consumers no longer restrict picture-taking to important events and special occasions. Images are being captured frequently, and of day-to-day occurrences in the consumers' life. Since a typical user has already accumulated many years of digital images and videos, browsing the collection to find images and videos taken during particular events is a very time-consuming process for the consumer.

There has been work in grouping images into events. U.S. Pat. No. 6,606,411 and U.S. Pat. No. 6,351,556 disclose algorithms for clustering image content by temporal events and sub-events. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Another method of automatically organizing images into events is disclosed in U.S. Pat. No. 6,915,011. The events detected are chronologically ordered in a timeline from earliest to latest.

Using the above methods, the amount of browsing required by the user to locate a particular event can be reduced by viewing representatives of the events along a timeline, instead of each image thumbnail. However, a typical user can still generate over 100 of such events for each year, and more prolific picture-takers can easily exceed a few hundred detected events per year. There is still a need to create an overall event timeline structure that is adaptable to the user's picture taking behavior as well as the time granularity of the events in their collections, and the ability to select a sub-set of events that summarizes the overall collection or a given time period in the collection.

SUMMARY OF THE INVENTION

In accordance with the present invention, there is provided a method for organizing an event timeline for a digital image collection comprising, using a processor for:

(a) detecting events in the digital image collection and each event's associated timespan;

(b) determining the detected events that are significant in the digital image collection; and (d) organizing the event timeline so that the detected events on the event timeline between the detected significant events are grouped into clusters on the event timeline.

Since the number of images and videos in a typical user's collection is growing rapidly and each user might have a different picture-taking behavior, there is a critical need to provide the user efficient access and retrieval of images and important events from their collections. In this invention, a user's picture-taking behavior in terms of detected events is translated into a timeline, where there is a data point for each time step. Then an adaptive event-based timeline is created where both the significance of the detected events as well as the time granularity of the events are taken into account.

The organization and retrieval of images and videos is a problem for the typical consumer. It is useful for a user to be able to easily access and browse an overview of events in their image collection. Technology disclosed in prior art permits the classification of images in a collection into events, but not the ability to adaptively create an event timeline that can be tailored to individual users according to their picture-taking behaviors. As a result, there is a lack of effective mechanisms for finding and accessing events that are of importance to the users. This invention creates an effective event-based timeline at different time scales, where both the significance of the detected events as well as the time granularity of the events is taken into account. This organized event timeline can be used for selecting images and determining emphasis when creating outputs such as albums and slideshows from a collection of images.

DETAILED DESCRIPTION OF THE INVENTION

The present invention can be implemented in computer systems as will be well known to those skilled in the art. In the following description, some embodiments of the present invention will be described as software programs. Those skilled in the art will readily recognize that the equivalent of such a method can also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts. Videos in a collection are included in the term "images" in the rest of the description.

Figure 1:
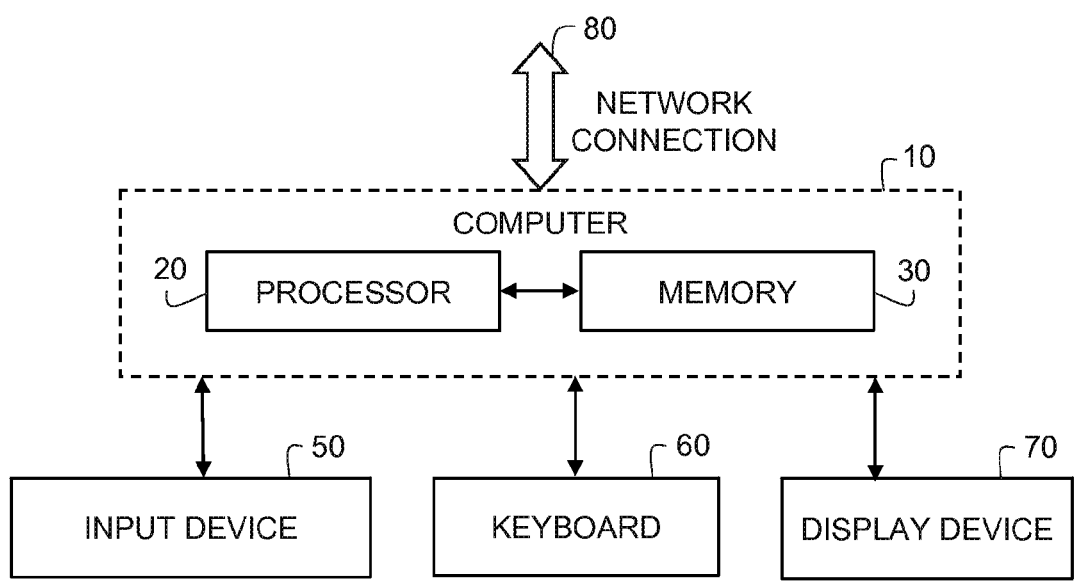
FIG. 1 is a block diagram of a system that practices the present invention.

The present invention can be implemented in computer hardware and computerized equipment. For example, the method can be performed in a digital camera, a multimedia smart phone, a digital printer, on an internet server, on a kiosk, and on a personal computer. Referring to FIG. 1, there is illustrated a computer system for implementing the present invention. Although the computer system is shown for the purpose of illustrating a preferred embodiment, the present invention is not limited to the computer system shown, but can be used on any electronic processing system such as found in digital cameras, home computers, kiosks, or any other system for the processing of digital images. A computer 10 includes a microprocessor-based unit 20 (also referred to herein as a processor) for receiving and processing software programs and for performing other processing functions. A memory unit 30 stores user-supplied and computer-generated data which can be accessed by the processor 20 when running a computer program. A display device (such as a monitor) 70 is electrically connected to the computer 10 for displaying information and data associated with the software, e.g., by use of a graphical user interface. A keyboard 60 is also connected to the computer. As an alternative to using the keyboard 60 for input, a mouse can be used for moving a selector on the display device 70 and for selecting an item on which the selector overlays, as is well known in the art. Input devices 50 such as compact disks (CD) and DVDs can be inserted into the computer 10 for inputting the software programs and other information to the computer 10 and the processor 20. Still further, the computer 10 can be programmed, as is well known in the art, for storing the software program internally. In addition, media files (such as images, music and videos) can be transferred to the memory 30 of the computer 10 by use of input devices 50 such as memory cards, thumb drives, CDs and DVDs, or by connecting a capture device (such as camera, cell phone, video recorder) directly to the computer 10 as an input device. The computer 10 can have a network connection 80, such as a telephone line or wireless connection, to an external network, such as a local area network or the Internet. Software programs and media files can be transferred to the computer 10 from other computers or the Internet through the network connection 80.

It should also be noted that the present invention can be implemented in a combination of software or hardware and is not limited to devices which are physically connected or located within the same physical location. One or more of the devices illustrated in FIG. 1 can be located remotely and can be connected via a network. One or more of the devices can be connected wirelessly, such as by a radio-frequency link, either directly or via a network.

Figure 2:
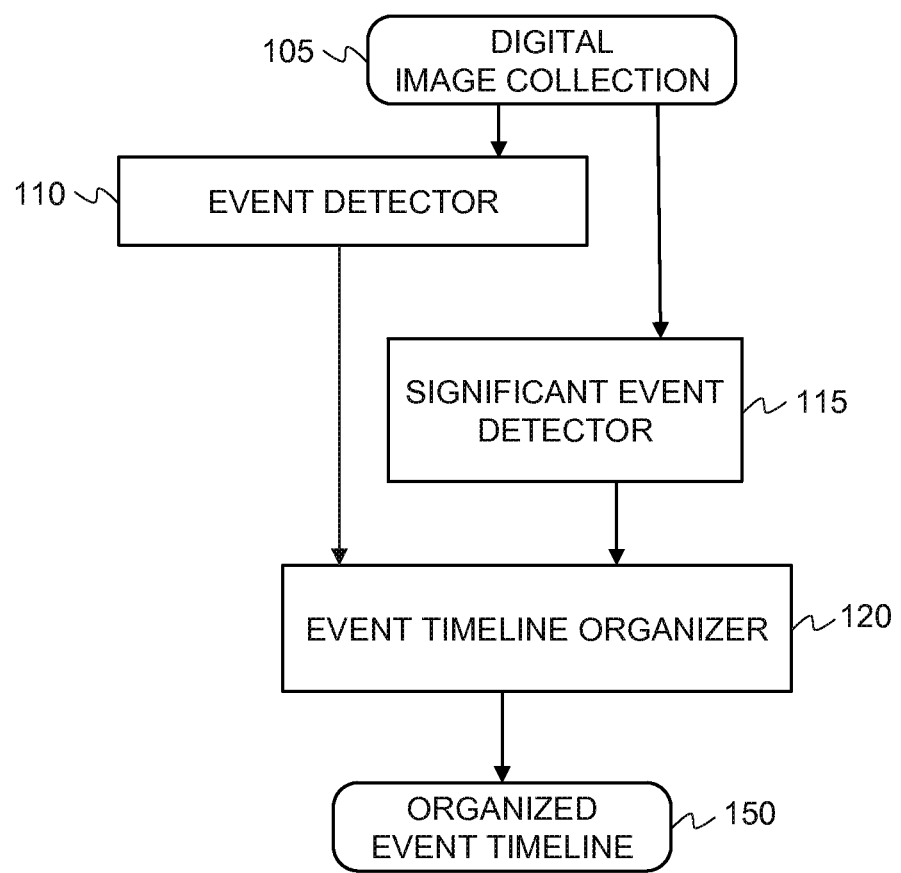
FIG. 2 is an overall flowchart of the method practiced by FIG. 1.

Referring to FIG. 2, a user's digital image collection 105 resides in the memory 30 of the computer 10. The other blocks in the figure are implemented by a software program and are executed by the processor 20 of the computer 10. The digital image collection 105 is provided to an event detector 110 and a significant event detector 115. The event detector 115 groups a user's digital image collection 105 into an event representation. In the preferred embodiment, the digital image collection 105 is grouped into temporal events and sub-events using event and sub-event detectors described in U.S. Pat. No. 6,606,411 and U.S. Pat. No. 6,351,556. The above two patents teach how to cluster images and videos in a digital image collection into temporal events and sub-events. The terms "event" and "sub-event" are used in an objective sense to indicate the products of a computer mediated procedure that attempts to match a user's subjective perceptions of specific occurrences (corresponding to events) and divisions of those occurrences (corresponding to sub-events). Briefly summarized, a collection of images is classified into events by determining a threshold for time differences between adjacent images of the collection based on a two-mean clustering of a histogram of time differences between adjacent images over the entire collection. The images are separated into groups corresponding to events based on having time differences at the boundary that are higher than the threshold determined in the earlier step. For each event, sub-events can be determined (if any) by comparing the color histogram information of successive images as described in U.S. Pat. No. 6,351,556. This is accomplished by dividing an image into a number of blocks and then computing the color histogram for each of the blocks. A block-based histogram correlation procedure is used as described in U.S. Pat. No. 6,351,556 to detect sub-event boundaries. Another method of automatically organizing images into events is disclosed in U.S. Pat. No. 6,915,011. Briefly summarized, according to one aspect of the above invention, an event clustering method uses foreground and background segmentation for clustering images from a group into similar events. Initially, each image is divided into a plurality of blocks, thereby providing block-based images. Using a block-by-block comparison, each block-based image is segmented into a plurality of regions including at least a foreground and a background. One or more luminosity, color, position or size features are extracted from the regions and the extracted features are used to estimate and compare the similarity of the regions including the foreground and background in successive images in the group. Then, a measure of the total similarity between successive images is computed, thereby providing image distance between successive images, and event groups are delimited from the image distances. The event timespan is the time between the beginning and end of the event, where the beginning of the event is represented by the capture time of the first image in the event, and the end is represented by the capture time of the last image of the event (or the end of capture of the video segment if the event ends with a video clip).

Referring to FIG. 2, the significant event detector 115 identifies significant events in the digital image collection 105. The digital image collection 105 is provided to the significant event detector 115. The detector uses the image capture date and time information extracted from the EXIF metadata stored in the image files of the digital image collection 105 by the capture device (such as a camera) to generate a time-series that shows the number of images captured on each calendar day of the time period covered by the digital image collection 105. This time-series is analyzed to find a model that fits the series. There are many well established methods for time-series modeling ("Introduction to Time Series and Forecasting", Brockwell and Davis, Springer-Verlag 2002). The model that is appropriate in this situation is the ARIMA (Auto-Regressive Integrated Moving Average) model (Brockwell and Davis, supra, pp 179-187). The model ARIMA (p, d, q) has three main parameters—p being the order of the autoregressive component, q being the order of the moving average component and d being the order of differencing required for dealing with the deviations from stationarity. Significant events in the collection are identified as occurring on the calendar days where the residuals between the fitted model and the actual time-series are higher than a specified threshold i.e. where the fitted model is less able to predict the actual data.

Figure 5:
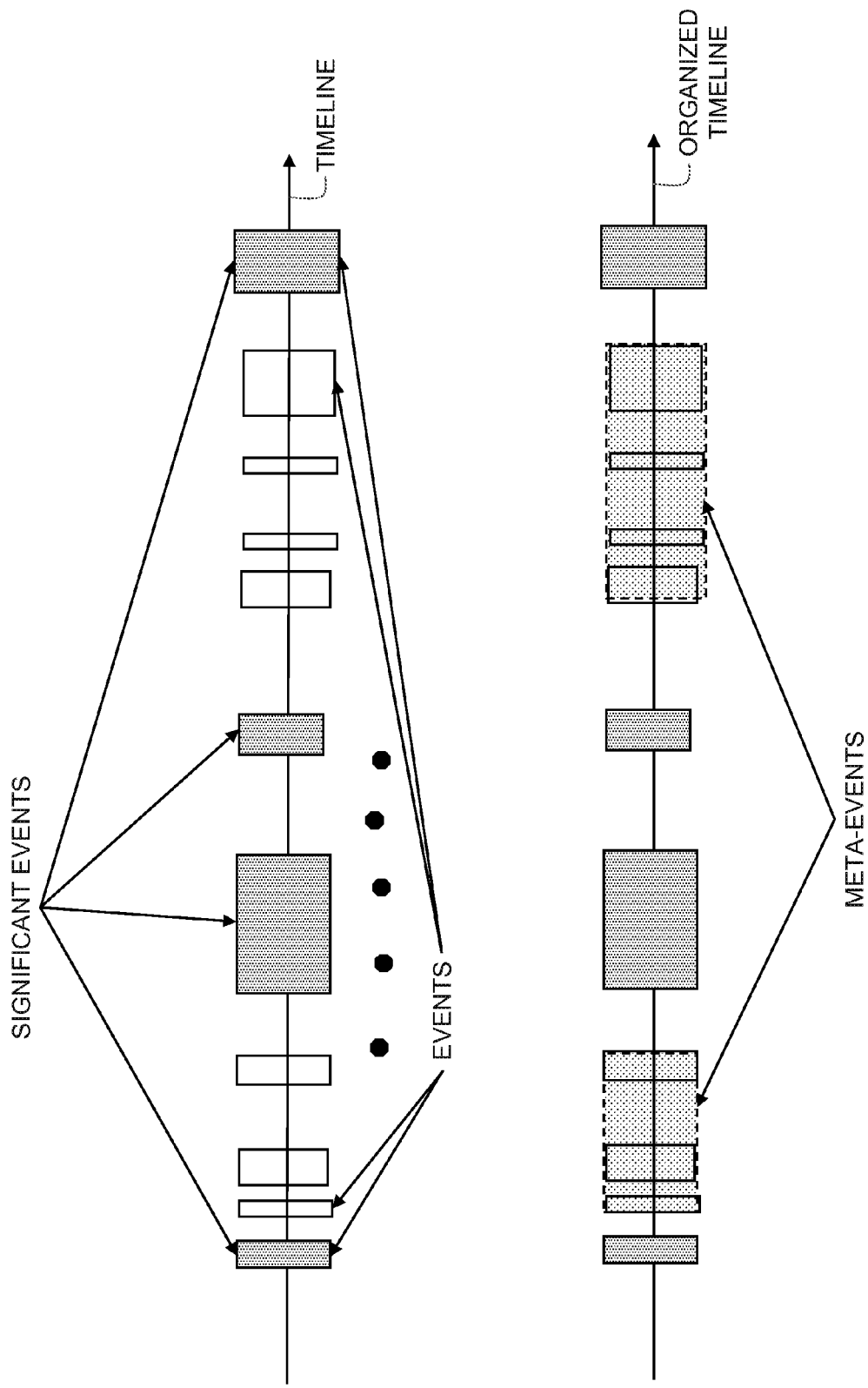
FIG. 5 shows a specific example of the input and output of the event timeline organizer 120 of FIG. 2.

Referring to FIG. 2, an event timeline organizer 120 accepts as input the events detected by the digital image collection 105 and the significant events identified by the significant event detector 115. In one embodiment, the event timeline organizer 120 retains the significant events on the timeline, and groups the events located between adjacent significant events on the timeline into clusters called meta-events. Each event occupies a section of the timeline specified by its timespan. As an example, the top row of FIG. 5 shows a timeline with events and significant events marked on it. The event timeline organizer produces the output shown in the bottom row of FIG. 5, where events between the significant events have been clustered into meta-events. A resulting organized event timeline 150 has a reduced number of top-level groupings that include meta-events (that are clusters of events) and significant events on the timeline. The user is therefore, presented with a less cluttered top-level view, while still keeping potential events of interest (the significant events) accessible at the top-level view. Other events can be accessed by expanding the meta-events, which can be described by the time durations they cover (for example, "Feb. 20-Apr. 2, 2009").

Figure 6:
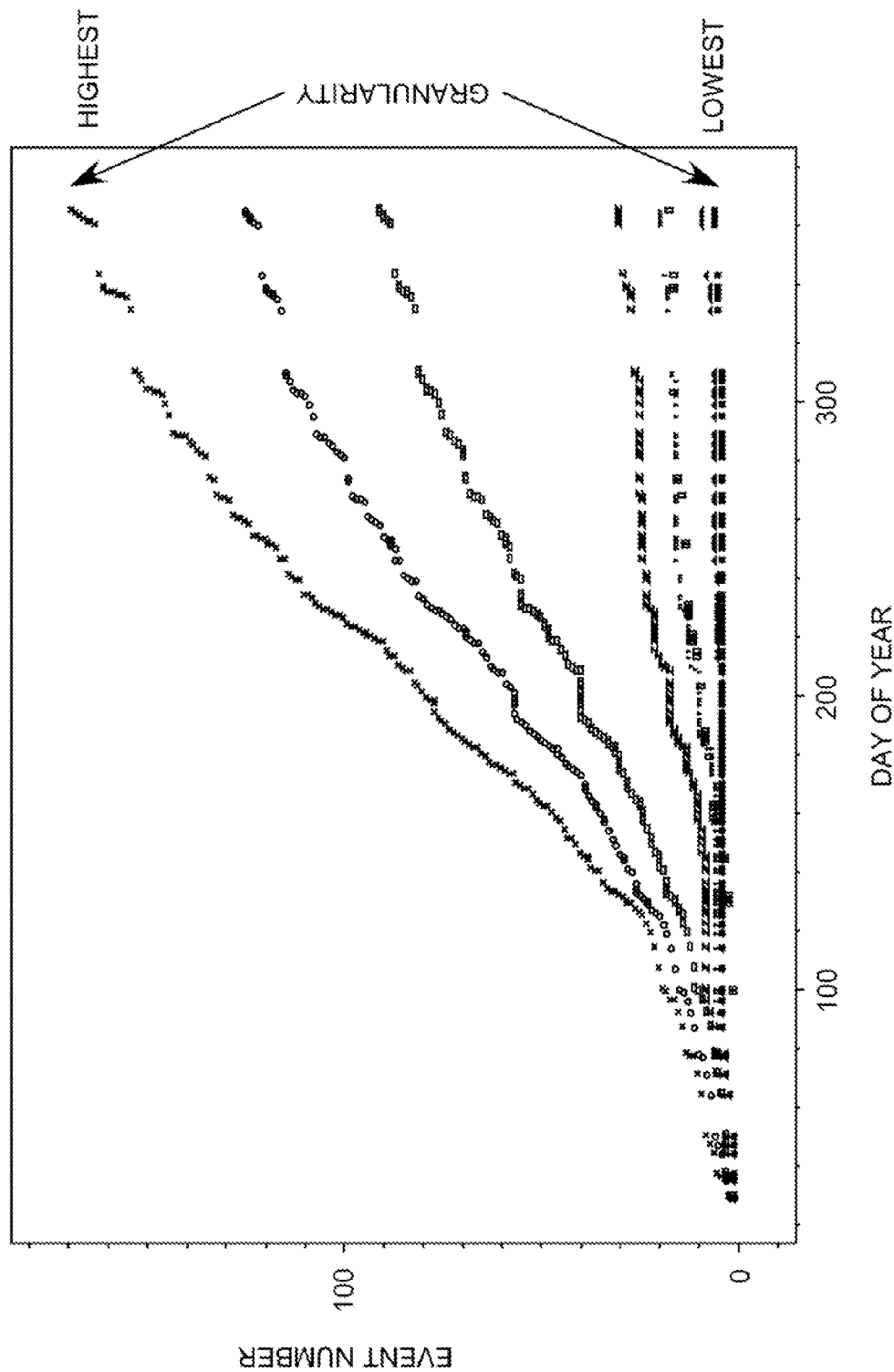
FIG. 6 shows a specific example of events generated at different granularity settings 215.

The method of U.S. Pat. No. 6,606,411 also provides a few key parameters for adjusting the number of events and sub-events generated from any given collection of images. The main parameter, "granularity", determines the overall granularity of event clustering. Valid values are in the range [−1, 1] with 0 being the "optimal" tuned setting. Larger values increase the number of events found by the algorithm while smaller values decrease the number of events. The actual internal mechanism has to do with adjusting the various thresholds for the two-means clustering. Some of these thresholds include high and low thresholds for global histogram comparisons and high and low thresholds for multi-block histogram comparisons to determine whether to merge two events or two sub-events. The events detected continue to be chronologically ordered in a timeline from earliest to latest. FIG. 6 is an illustration of the set of events generated using different settings of the granularity parameter. The graph plots the number of events detected during the span of one year. In the example shown, the final number of events for the entire year varies from less than 10 to close to 170 based on the granularity parameter setting provided.

Figure 3:
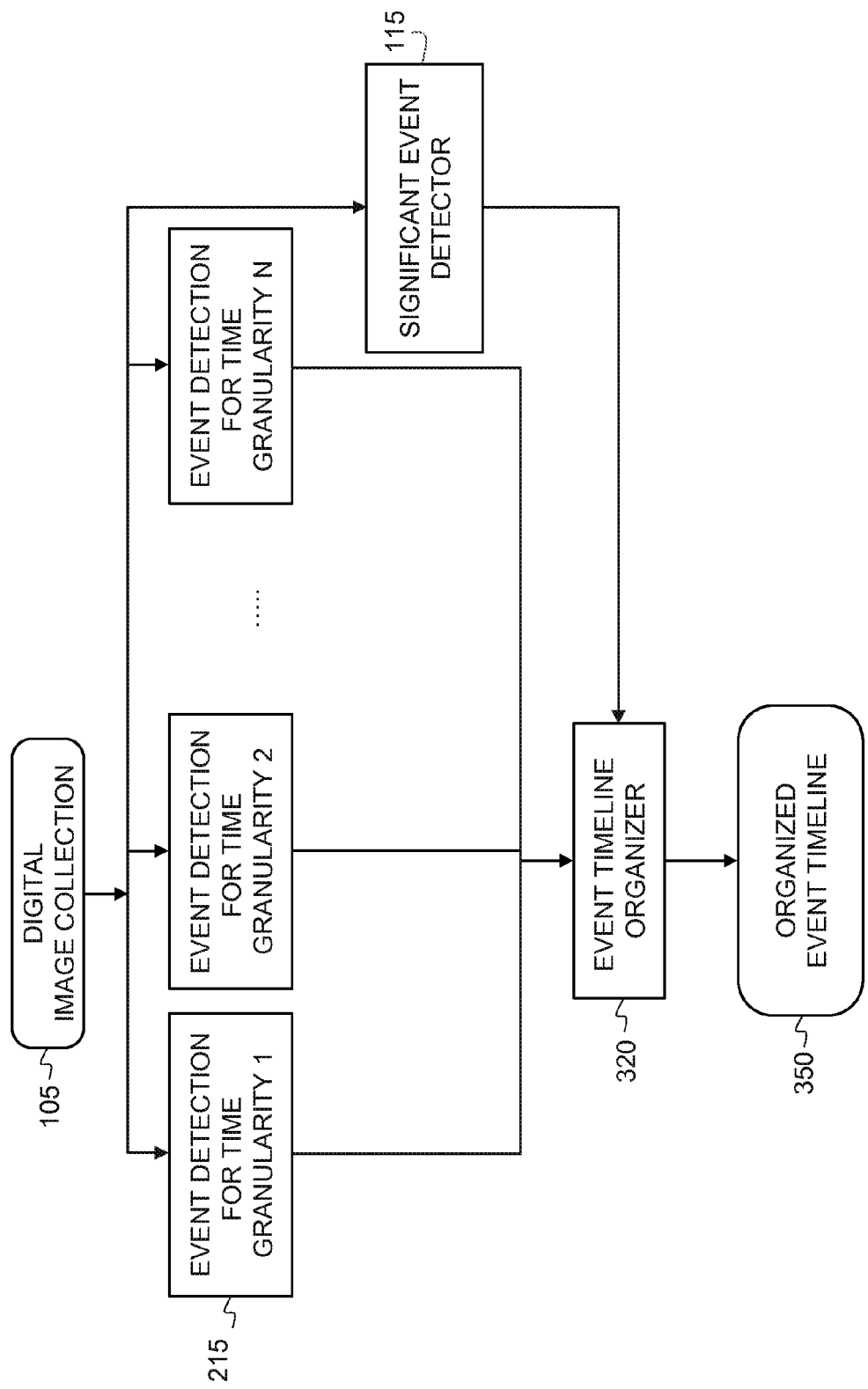
FIG. 3 is a more detailed flowchart showing one embodiment of the method of FIG. 2.
Figure 7:
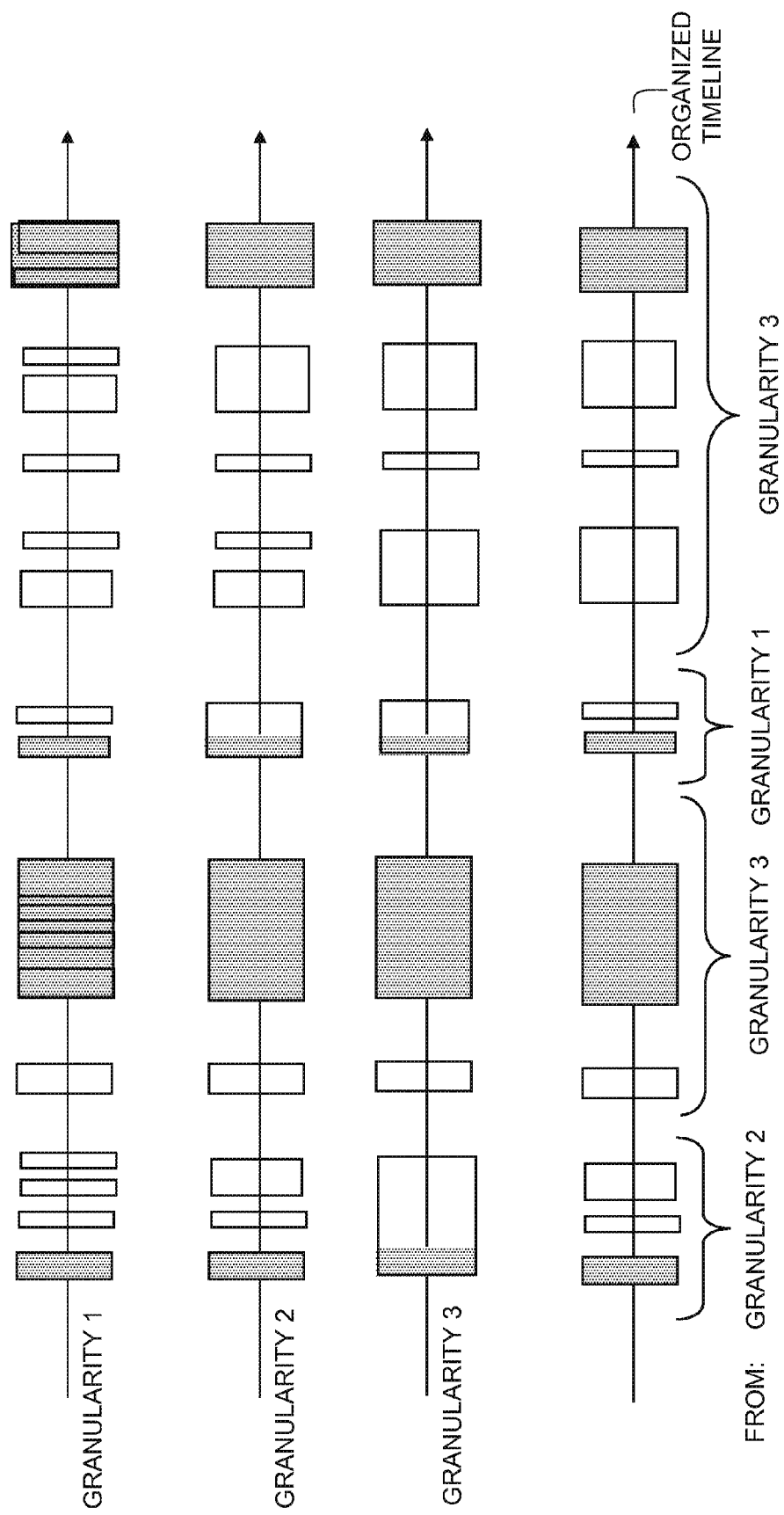
FIG. 7 is a specific example of the input and output of the event timeline organizer 320 of FIG. 4.

Referring to FIG. 3, the digital image collection 105 is processed by event detectors 215 with the granularity parameter set at a range of values covering the [−1, 1] range. The digital image collection 105 is also processed by the significant event detector 115 and the output is provided to an event timeline organizer 320. In this embodiment of the event timeline organizer 320, the timeline is broken up into time periods around significant events. The boundaries of the time periods are at the mid-point of the time between any two adjacent significant events. In each time period containing a significant event, the events detected at the smallest granularity setting (producing fewest events) is selected that still contains the significant event as a detected event. For example, referring to FIG. 7, the top three timelines show the significant event detector 115 output at different granularities (granularity 1 being the smallest, and granularity 3 being the largest). The significant events are the highlighted events. The last row shows an organized event timeline 350 with different time periods of the time-line selecting events from different granularity settings, based on the smallest granularity that provides a correct representation of the significant event in that time period. This method ensures that significant events are available on the organized timeline 350 and other events are presented at appropriate granularity around the significant events.

Figure 4:
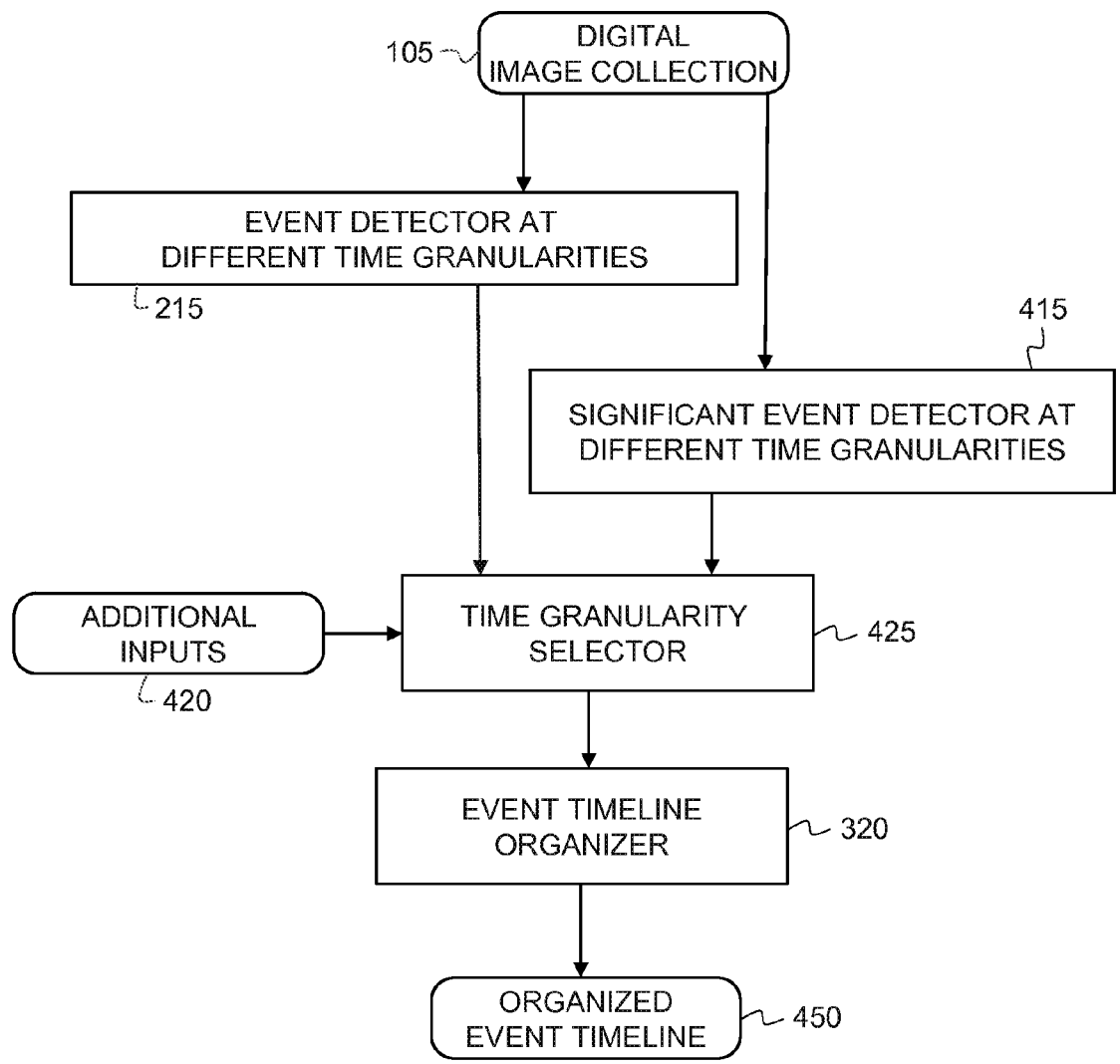
FIG. 4 is a more detailed flowchart of a second embodiment of the method of FIG. 2.

Referring to FIG. 4, the digital image collection 105 is processed by event detectors 215 with the granularity parameter set at a range of values covering the [−1, 1] range. The digital image collection 105 is also processed by the significant event detector 115 using time bins of different granularities. A set of time units are determined—these time units can be a few months (capturing a season), a month, a week, a day, or hours—the size of the unit being referred to as granularity. The time-series at different granularities is produced by counting the number of images captured in the given time unit or bin. The output of the event detectors 215 and the significant event detector 115 at different granularities 415 is provided to a time granularity selector 425, along with additional inputs 420. The time granularity selector 425 selects a time granularity and extracts the set of events and significant events corresponding to that time granularity from its input sets. The additional inputs 420 can include user actions, system requirements or user preferences. The set of events and the significant events selected are passed on to the event timeline organizer 320 described earlier to produce an organized timeline 450. The event timeline organizer 120 can also be used instead of event timeline organizer 320 to produce a different organized timeline for each time granularity. In one embodiment of the invention, the user can then select the timeline from this set of event timelines. The additional inputs 420 are used as follows. In a browsing application, events and significant events can be selected at the time granularity at which the user selects to view the collection. For example, if the user is viewing a short time-span of a few weeks, a finer granularity setting (higher number) is used for selecting the events and significant events; whereas, if the user is viewing a longer time-span (e.g. the collection over five years), a lower value of granularity is selected for events and significant events. The system requirement in terms of display capability can also dictate the number of top-level events on the organized event timeline, and therefore, the granularity selected. For example, if approximately 10 events will fit the display, then the granularity is selected so that the number of events and significant events is close to that number. The user can also set the preference for viewing the events at a certain granularity, and the time granularity selector selects this setting for the given user.

Figure 8:
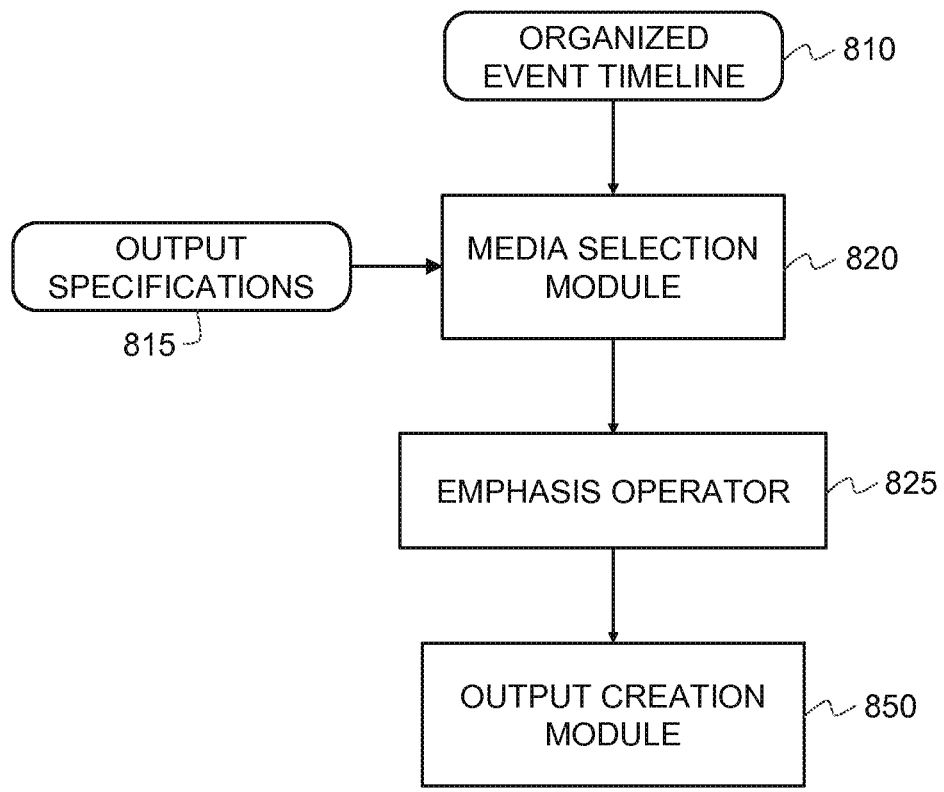
FIG. 8 is a flowchart of the use of the organized event timeline for output creation.

One of the challenges of creating an output album (hard copy) or slideshow (soft copy) from a collection of images is the selection of images to include and the emphasis to be placed on each of the selected images. Referring to FIG. 8, the organized event timeline 810 (which can be 150, 350 or 450) is provided to a media selection module 820 which selects the images to be used from the digital image collection 105. The media selection module 820 also receives the output specifications 815 as input. The output specifications 815 include the number of images to be selected, and the section of the timeline to be used for the selection e.g. select 12 images from a one year time-span to generate a picture calendar as output. The media selection module 820 prioritizes events in the time-span selected as follows. The events are weighted in proportion to the number of images in the event, after inflating the number of images in significant events by multiplying by a significance factor (e.g. 2.0). The number of images in the output specification is distributed among the events proportional to their weight. Let $n_1 \ldots n_m$ be the image counts of m events, where n=(significance factor*actual image count) for significant events and n=actual image count for the rest of the (non-significant) events. Then the weight assigned to any event k is $$\frac{n_k}{\sum_{i=1}^{m} n_i},$$

and the number of images assigned to this event is the (weight*number of images specified by the output specifications). Note that fractional number of images assigned will need to be rounded to whole numbers, and therefore, some events can receive 0 images assigned to them (if they are assigned less than 0.5 images).

The selection of a given number of images from a specific event can be done simply based on sampling the event images at equal intervals. There are also more intelligent methods for performing this selection—taking into account image quality, diversity and specific semantic features such as people and objects present—which can be used in this step. For example, the selection can be based on the technical quality of the image (A. Loui, M. Wood, A. Scalise, and J. Birkelund, "Multidimensional image value assessment and rating for automated albuming and retrieval," *Proc. IEEE Intern. Conf on Image Processing (ICIP)*, San Diego, Calif., Oct. 12-15, 2008) or aesthetic quality of an image (C. Cerosaletti, and A. Loui, "Measuring the perceived aesthetic quality of photographic images," *Proc. 1st International Workshop on Quality of Multimedia Experience* (QoMEX), San Diego, Calif., Jul. 29-31, 2009). However, this is not a focus of the present invention which aims to provide a selection and weighting mechanism at the event-level.

The selected images are provided to an emphasis operator 825. The emphasis operator 825 generates emphasis scores to highlight particular images from the selected set. In one embodiment, images from non-significant events have the default emphasis score, whereas the selected images that belong to significant events are assigned emphasis scores by multiplying the default score by a significance factor greater than 1.0. The emphasis scores can be based on the score for the technical quality of the image (: A. Loui, M. Wood, A. Scalise, and J. Birkelund, "Multidimensional image value assessment and rating for automated albuming and retrieval," *Proc. IEEE Intern. Conf on Image Processing (ICIP)*, San Diego, Calif., Oct. 12-15, 2008) or aesthetic quality of an image (C. Cerosaletti, and A. Loui, "Measuring the perceived aesthetic quality of photographic images," *Proc. 1st International Workshop on Quality of Multimedia Experience* (QoMEX), San Diego, Calif., Jul. 29-31, 2009), or a combination of the two scores. The output creation module 850 uses the emphasis score and image selection to produce a creative presentation of the images. For hard copy (such as photobooks, calendars, cards), the emphasis score can control the size of the image in the output or the prominence of position in the page. For soft copy (such as a slideshow on digital photo frames, computer monitor or other display devices), the emphasis score can be used to assign screen time for the image i.e. images with higher emphasis scores will be displayed for longer duration. Higher emphasis scores can also provide triggers for highlighting such as decorative boxes around the image in both forms of presentation.

This invention has been described in detail with particular reference to certain preferred embodiments thereof, but it will be understood that variations and modifications can be effected within the spirit and scope of the invention.

| PARTS LIST | |
|---|---|
| 10 | Computer |
| 20 | Processor |
| 30 | Memory |
| 50 | Input device |
| 60 | Keyboard |
| 70 | Display device |
| 80 | Network connection |
| 105 | Digital image collection |
| 110 | Event detector |
| 115 | Significant event detector |
| 120 | Event timeline organizer |
| 150 | Organized event timeline |
| 215 | Event detectors at different granularities |
| 320 | Event timeline organizer |
| 350 | Organized event timeline |
| 415 | Significant event detector at different granularities |
| 420 | Additional inputs |
| 425 | Time granularity selector |
| 450 | Organized event timeline |
| 810 | Organized event timeline |
| 815 | Output specifications |
| 820 | Media selection module |
| 825 | Emphasis operator |
| 850 | Output creation module |

The invention claimed is:

1. A method for organizing a digital image collection, the method comprising:
   detecting, by a computing device, a plurality of events in the digital image collection and an associated timespan for each event of the plurality of events;
   determining, by the computing device, significant events from the plurality of events in the digital image collection, wherein the determining significant events comprises:
      generating a time series that indicates a number of images captured during a time period covered by the digital image collection;
      analyzing the time series to find a model that identifies the significant events; and
      identifying periods of time in which residuals between the model and the time series exceed a specified threshold; and
   organizing, by the computing device, the plurality of events into an event timeline, such that detected events on an event timeline between the determined significant events are grouped into clusters on the event timeline.

2. The method of claim 1, wherein the detecting the plurality of events comprises detecting the plurality of events based on a selected time granularity.

3. The method of claim 2, further comprising enabling user browsing of images associated with at least one detected event of the plurality of events.

4. A method for organizing a digital image collection, the method comprising:
   detecting, by a computing device, a first plurality of events in the digital image collection for a first event timeline and an associated timespan for each event of the first plurality of events based on a first selected time granularity;
   detecting, by the computing device, a second plurality of events in the digital image collection for a second event timeline and an associated timespan for each event of the second plurality of events based on a second selected time granularity that is different from the first selected time granularity;

determining, by the computing device, significant events from the first and second pluralities of events in the digital image collection, wherein the determining comprises, for each of the first event timeline and the second event timeline:
generating a time series that indicates a number of images based on the first or second selected time granularity;
analyzing the time series to find a model for each of the first event timeline and the second event timeline that identifies the significant events; and
identifying periods of time in which residuals between the model and the time series exceed a specified threshold; and
organizing, by the computing device, the first event timeline and the second event timeline, such that detected events on the first event timeline and the second event timeline between the determined significant events are grouped into clusters on the first event timeline and the second event timeline, respectively, and such that the first event timeline is produced with a time granularity different from the second event timeline.

5. The method of claim 4, further comprising:
presenting a display of the first event timeline and the second event timeline; and
receiving a user selection of one of the first event timeline or the second event timeline.

6. The method of claim 5, further comprising enabling user browsing of images associated with at least one detected event of the plurality of events for the selected first event timeline or second event timeline.

7. A method for organizing a digital image collection, the method comprising:
detecting, by a computing device, a plurality of events in the digital image collection and an associated timespan for each event of the plurality of events at different time granularities;
determining, by the computing device, significant events from the plurality of events in the digital image collection at each time granularity, wherein the determining significant events comprises:
generating a time series that indicates a number of images captured over a time period covered by the digital image collection;
analyzing the time series to find a model that identifies the significant events;
identifying periods of time in which residuals between the model and the time series exceed a specified threshold; and
selecting, by the computing device, a granularity of event detection for each time period of an event timeline; and
organizing, by the computing device, the event timeline, so that the detected plurality of events on the event timeline in each time period are based on the selected granularity of event detection for the time period.

8. The method of claim 7, wherein the selecting the granularity of event detection is based on choosing the fewest detected events that preserve the significant events during a given time period.

9. A method of selecting images from a digital image collection, the method comprising:
detecting, by a computing device, a plurality of events in the digital image collection and an associated timespan for each event of the plurality of events;
determining, by the computing device, significant events from the plurality of events in the digital image collection, wherein the determining significant events comprises:
generating a time series that indicates a number of images captured during a time period covered by the digital image collection;
analyzing the time series to find a model that identifies the significant events; and
identifying periods of time in which residuals between the model and the time series exceed a specified threshold;
assigning, by the computing device, a weight to each event of the plurality of events based on a significance of the event and a number of images associated with the event; and
selecting, by the computing device, images in response to the assigned weights.

10. The method of claim 9, further comprising:
producing an emphasis score using an emphasis operator; and
controlling a presentation of an output of images based on the emphasis score.

11. The method of claim 9, wherein the output comprises a hardcopy output that includes albums, calendars, photo books, montages, or cards.

12. The method of claim 9, wherein the output comprises a softcopy output that includes slide shows, digital frames, or montages.

13. The method of claim 1, wherein the analyzing the time series to find a model comprises determining if a model fits the time series.

14. The method of claim 1, wherein the identifying comprises determining when the model is less able to predict actual data of the time series.

15. A non-transitory computer-readable medium having instructions stored thereon that, upon execution by a computing device, cause the computing device to perform operations comprising:
detecting a plurality of events in the digital image collection and an associated timespan for each event of the plurality of events;
determining significant events from the plurality of events in the digital image collection, wherein the determining significant events comprises:
generating a time series that indicates a number of images captured during a time period covered by the digital image collection;
analyzing the time series to find a model that identifies the significant events; and
identifying periods of time in which residuals between the model and the time series exceed a specified threshold; and
organizing the plurality of events into an event timeline, such that detected events on an event timeline between the determined significant events are grouped into clusters on the event timeline.

16. The non-transitory computer-readable medium of claim 15, wherein the detecting the plurality of events comprises detecting the plurality of events based on a selected time granularity.

17. The non-transitory computer-readable medium of claim 16, wherein the operations further comprise enabling user browsing of images associated with at least one detected event of the plurality of events.

18. The non-transitory computer-readable medium of claim 15, wherein the analyzing the time series to find a model comprises determining if a model fits the time series.

19. The non-transitory computer-readable medium of claim 15, wherein the identifying comprises determining when the model is less able to predict actual data of the time series.

20. A system comprising:
a memory; and
a processor coupled to the memory, wherein the processor is configured to:
  detect a plurality of events in the digital image collection and an associated timespan for each event of the plurality of events;
  determine significant events from the plurality of events in the digital image collection, wherein to determine the significant events the processor is further configured to:
    generate a time series that indicates a number of images captured during a time period covered by the digital image collection;
    analyze the time series to find a model that identifies the significant events; and
    identify periods of time in which residuals between the model and the time series exceed a specified threshold; and
  organize the plurality of events into an event timeline, such that detected events on an event timeline between the determined significant events are grouped into clusters on the event timeline.

* * * * *

UNITED STATES PATENT AND TRADEMARK OFFICE
CERTIFICATE OF CORRECTION

| | | |
|---|---|---|
| PATENT NO. | : 8,718,386 B2 | Page 1 of 1 |
| APPLICATION NO. | : 12/710666 | |
| DATED | : May 6, 2014 | |
| INVENTOR(S) | : Das et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 704 days.

Signed and Sealed this
Eleventh Day of August, 2015

Michelle K. Lee
*Director of the United States Patent and Trademark Office*